(12) United States Patent
Pekema

(10) Patent No.: US 9,074,680 B2
(45) Date of Patent: Jul. 7, 2015

(54) PADDLE-SHIFT LOGIC FOR DOWN-SHIFTING AUTOMATIC VEHICLE TRANSMISSIONS

(71) Applicant: Toyota Motor Engineering & Manufacturing North America, Inc., Erlanger, KY (US)

(72) Inventor: Andrew W. Pekema, Torrance, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 58 days.

(21) Appl. No.: 13/953,489

(22) Filed: Jul. 29, 2013

(65) Prior Publication Data

US 2015/0032339 A1    Jan. 29, 2015

(51) Int. Cl.
    *G06F 7/00*        (2006.01)
    *F16H 59/04*       (2006.01)
    *F16H 59/02*       (2006.01)

(52) U.S. Cl.
    CPC ...... *F16H 59/044* (2013.01); *F16H 2059/0247* (2013.01); *F16H 59/02* (2013.01); *F16H 2059/0243* (2013.01); *F16H 2059/0252* (2013.01); *Y10T 74/2014* (2015.01)

(58) Field of Classification Search
    CPC . F16H 59/00; F16H 59/02; F16H 2059/0239; F16H 2059/0243; F16H 2059/0247; F16H 2059/0252; F16H 59/044; Y10T 74/2014
    See application file for complete search history.

(56) References Cited

U.S. PATENT DOCUMENTS

| 5,179,867 | A  | * | 1/1993  | Sakakibara et al. | 74/335 |
|---|---|---|---|---|---|
| 5,335,743 | A  |   | 8/1994  | Gillbrand et al. | |
| 5,456,333 | A  |   | 10/1995 | Brandt et al. | |
| 6,109,126 | A  |   | 8/2000  | Cochran et al. | |
| 6,151,543 | A  | * | 11/2000 | McKee et al. | 701/55 |
| 6,962,552 | B2 |   | 11/2005 | Sakamoto et al. | |
| 7,603,924 | B2 |   | 10/2009 | Mandou et al. | |
| 7,717,823 | B2 |   | 5/2010  | Balamucki et al. | |
| 8,186,241 | B2 |   | 5/2012  | Sickart | |
| 2005/0045447 | A1 | * | 3/2005 | Sebata et al. | 192/220.2 |
| 2007/0099752 | A1 | * | 5/2007 | Saito et al. | 477/34 |
| 2007/0204710 | A1 | * | 9/2007 | Mandou et al. | 74/335 |
| 2008/0021609 | A1 |   | 1/2008 | Derby et al. | |
| 2008/0125283 | A1 | * | 5/2008 | Balamucki et al. | 477/34 |
| 2009/0200761 | A1 |   | 8/2009 | Stevens | |
| 2009/0270223 | A1 |   | 10/2009 | Cook | |

(Continued)

OTHER PUBLICATIONS

Electro-Pneumatic Systems for Formula SAE Application; USC Racing; http:uscracing.wikispaces.com/Electro-Pneumatic+Shifting; 6 pages; printed on Mar. 8, 2013.

(Continued)

*Primary Examiner* — David D Le
(74) *Attorney, Agent, or Firm* — Snell & Wilmer LLP

(57) ABSTRACT

A system for shifting an automatic or continuously variable transmission of a vehicle. The system includes a plurality of wheels, an engine, a transmission, a memory, a processor, and a paddle shifter. The engine provides a torque to the plurality of wheels through the transmission. The transmission has a plurality of set gear ratios to shift through. The processor detects when the paddle shifter is pressed and held, to instruct the transmission to perform a first half shift. When the paddle shifter is subsequently released, the processor instructs the transmission to perform a second half shift, completing a full shift.

26 Claims, 7 Drawing Sheets

(56) References Cited

U.S. PATENT DOCUMENTS

| | | | |
|---|---|---|---|
| 2011/0295475 A1* | 12/2011 | Shimizu et al. | 701/66 |
| 2012/0059556 A1 | 3/2012 | Tanaka et al. | |
| 2012/0144947 A1 | 6/2012 | Herbert et al. | |
| 2012/0204668 A1 | 8/2012 | Zito et al. | |
| 2014/0116179 A1* | 5/2014 | Sata | 74/473.31 |

OTHER PUBLICATIONS

Electric Gearshift Actuator; Magneti Marelli S.p.A.; 2 pages; Nov. 2009.

* cited by examiner

PADDLE-SHIFT LOGIC FOR DOWN-SHIFTING AUTOMATIC VEHICLE TRANSMISSIONS

BACKGROUND

1. Field

The present application relates to shifting an automatic transmission.

2. Description of the Related Art

Automatic transmissions (AT) and continuously variable transmissions (CVT) do not require shifting through a shift lever, which allows for alternative shifting controls. For example, steering wheel mounted paddle shifters or buttons allow drivers to perform shifts. Conventionally, a shift is performed when the paddle or button is pressed all the way down. However, these immediate shifts tend to create sudden shifts with large changes in ratio. As a result, engine braking is unavoidable during down-shifts. The driver also may experience down-shift shock. Down-shift shock occurs when changing gears, because the interruption of torque or power can result in the driver being suddenly moved forward then back again.

Thus, there is a need for reducing down-shift shock when using a paddle or button to shift an automatic transmission vehicle.

SUMMARY

The present application relates to a vehicle that can be paddle-shifted. In one implementation, a system for performing a gear shift in an automobile comprises a transmission capable of shifting gears, a paddle shifter configured to send a first signal when the paddle shifter is actuated from a released position to an actuated position for a predetermined amount of time, and configured to send a second signal when the paddle shifter returns to the released position from the actuated position, and a processor connected to the paddle shifter and configured to receive the first signal and the second signal from the paddle shifter, the processor further configured to command the transmission to perform a first half-shift after receiving the first signal and command the transmission to perform a second half-shift after receiving the second signal to complete a full shift.

In another implementation, a system for performing a gear shift in an automobile comprises a transmission capable of shifting gears, a paddle shifter configured to send a first signal when the paddle shifter is actuated from a released position to an actuated position for a predetermined amount of time, and configured to send a second signal when the paddle shifter returns to the released position from the actuated position, and a processor connected to the paddle shifter and configured to receive the first signal and the second signal from the paddle shifter, the processor further configured to command the transmission to perform a first shift after receiving the first signal and command the transmission to perform a second shift after receiving the second signal.

In yet another implementation, a method for shifting a gear in an automobile comprises sending a first signal in response to a paddle shifter being actuated from a released position to an actuated position for a predetermined amount of time, commanding a transmission to perform a first shift operation in response to the first signal, sending a second signal in response to the paddle shifter being released from the actuated position to the released position, and commanding the transmission to perform a second shift operation in response to the second signal.

BRIEF DESCRIPTION OF THE DRAWINGS

The features, obstacles, and advantages of the present application will become more apparent from the detailed description set forth below when taken in conjunction with the drawings, wherein.

DETAILED DESCRIPTION

Apparatus, systems and methods that implement the implementations of the various features of the present application will now be described with reference to the drawings. The drawings and the associated descriptions are provided to illustrate some implementations of the present application and not to limit the scope of the present application. Throughout the drawings, reference numbers are re-used to indicate correspondence between referenced elements.

Figure 1A:
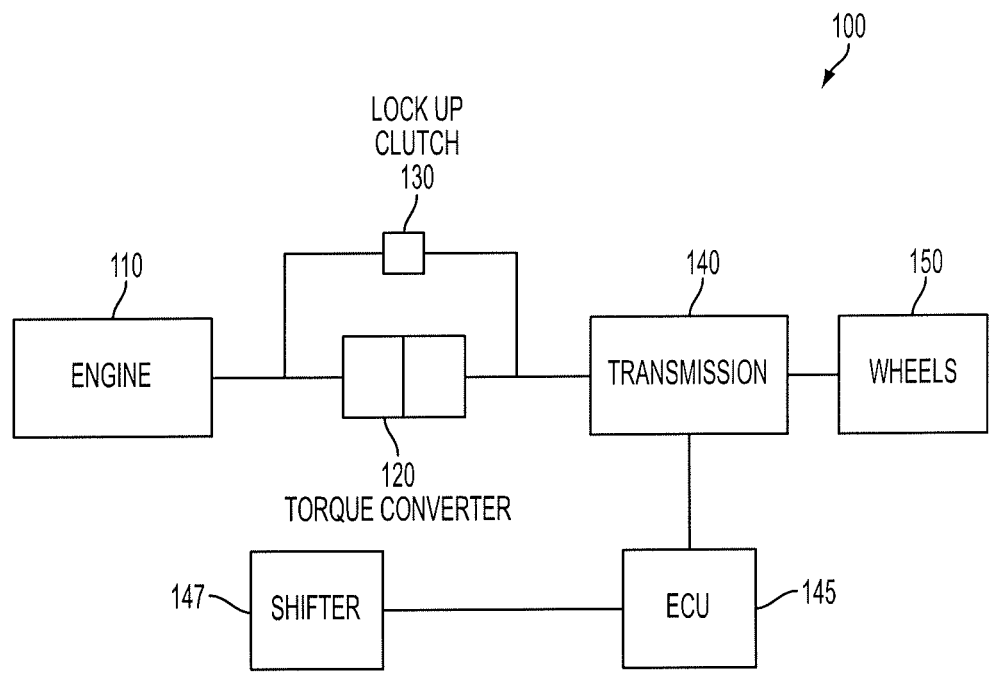
FIG. 1A is a basic conceptual diagram of a vehicle engine and transmission according to an implementation of the present application.

FIG. 1A presents a block diagram of a vehicle 100. The vehicle 100 includes an engine 110, a torque converter 120, a lock-up clutch 130, a transmission 140, wheels 150, an ECU 145, and a shifter 147. The engine 110 can be an internal combustion engine (ICE). The ICE can combust fuel, such as gasoline, ethanol, diesel, biofuel, or other types of fuels which are suitable for combustion. In other implementations, the engine 110 may be an electric motor or a hybrid engine.

The transmission 140 may be a step transmission, such as an AT, or may be a CVT. The transmission 140 provides power to the wheels 150 to move the vehicle 100. The shifter 147 may be a paddle shifter, button, or other signaling mechanism which sends shift signals to the ECU 145. Based on signals from the shifter 147, the ECU 145 may command the transmission 140 to shift gears.

The torque converter 120 and the lock-up clutch 130 transfers rotational power from the engine 110 to the transmission 140. In an automatic transmission, the torque converter 120 and the lock-up clutch 130 may take the place of a mechanical clutch of a manual transmission. The torque converter 120 may multiply torque when there is a difference between the input and the output rotational speed, providing the equivalent of a reduction gear. The lock-up clutch 130 may rigidly bind the engine 110 to the transmission 140 when their rotational speeds are similar, in order to prevent gear or transmission slippage. The torque converter 120 and the lock-up clutch 130 are normally controlled automatically, such that a driver has no direct control.

Figure 1B:
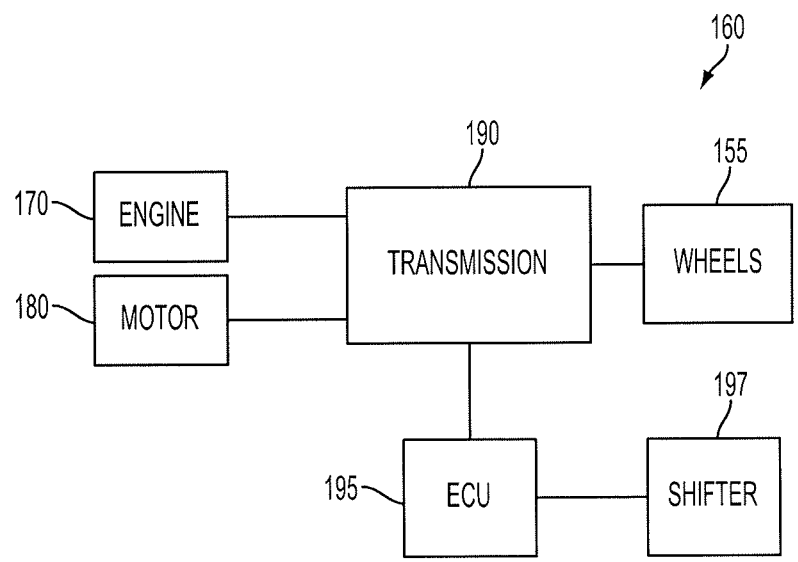
FIG. 1B is a basic conceptual diagram of a hybrid drivetrain according to an implementation of the present application.

FIG. 1B presents a block diagram of a hybrid vehicle 160. The hybrid vehicle 160 includes an engine 170, a motor 180, a transmission 190, an ECU 195, a shifter 197, and wheels 155. The engine 170 can be an ICE, similar to the engine 110. The motor 180 may be a motor-generator or other electrical motor, which works in conjunction with the engine 170 in a hybrid system. Alternatively, the motor 180 may be two motors operating in tandem to output torque and/or serve as a generator. Because of the hybrid system, in which the transmission 190 may be a CVT, there is no lock-up clutch or torque converter. Other similarly named components may operate similar to the components of the vehicle 100.

Figure 2A:
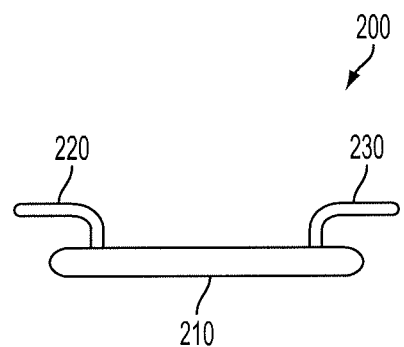
FIGS. 2A and 2B illustrates positions of a paddle shifter according to an implementation of the present application.
Figure 2B:
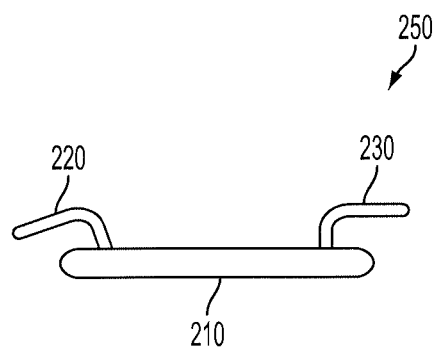

FIGS. 2A and 2B present top-down view diagrams 200 and 250, respectively, of a steering wheel 210, a down-shift paddle 220, and an up-shift paddle 230. Although in FIGS. 2A and 2B the down-shift paddle 220 and up-shift paddle 230 are paddles protruding from the steering wheel 210, in other implementations the down-shift paddle 220 and up-shift paddle 230 may be located elsewhere or take a different form, such as buttons on a dash panel.

In FIG. 2A, the down-shift paddle 220 and the up-shift paddle 230 are in a normal state, i.e., an un-pressed or released position. In FIG. 2B, the down-shift paddle 220 has been pressed, or placed in an actuated position. Conventionally, when the down-shift paddle 220 is pressed, a full down-shift is performed. Since the down-shift is triggered by the pressing of the down-shift paddle 220, no action occurs when the down-shift paddle 220 is released.

In order to reduce down-shift shock, two half down-shifts provides a smoother transition than a full down-shift. To provide a half down-shift control without changing the paddle shifters, the paddle shift logic of the present application detects whether a shift paddle is held or not. When the down-shift paddle 220 is first pressed and held for at least a predetermined amount of time, such as 0.5 seconds or 1 second, a first half down-shift is triggered. When the down-shift paddle 220 is subsequently released, the second half down-shift is performed, completing the full down-shift. Quickly pressing and releasing the down-shift paddle 220 may perform a full down-shift.

Depending on the transmission type, a half down-shift can be implemented in several ways. For a vehicle with an AT or other step transmission, such as the vehicle 100 with the transmission 140, the half down-shift can be implemented through the lock-up clutch 130. The first half down-shift may comprise the lock-up clutch 130 unlocking the torque converter 120, i.e., releasing the lock-up clutch 130. The second half down-shift may comprise an actual changing of the gears of the transmission 140. In this way, the half down-shift provides more manual control over the lock-up clutch 130.

For a vehicle with a step transmission with many gears, such as an 8-speed AT, a full down-shift may be performed for each half down-shift action. Pressing and holding the down-shift paddle 220 for the predetermined amount of time may trigger a first full down-shift, and subsequently releasing the down-shift paddle 220 may trigger a second full down-shift. With many gears to down-shift, this control provides the driver an easier way to down-shift several gears over having to quickly press and release the down-shift paddle 220 multiple times.

For a vehicle with a CVT, such as the vehicle 160 having the transmission 190, the CVT allows for infinite gear ratios. In other words, the transmission 190 can shift in half gears or other gear ratio between standard gear ratios. The mid-gear ratio may be halfway between the standard gear ratios, or may be a different fraction between gear ratios. In addition, the mid-gear ratio may lie at different fractions between each pair of standard gear ratios. For example, a half down-shift from the third gear may be a down-shift to a mid-gear ratio about halfway between the third gear ratio and the second gear ratio. The half down-shift from the second gear to the first gear may be a mid-gear ratio one third of the range between the second gear ratio and the first gear ratio. The second half down-shift may then be a down-shift to the lower gear, completing the full down-shift.

Figure 3A:
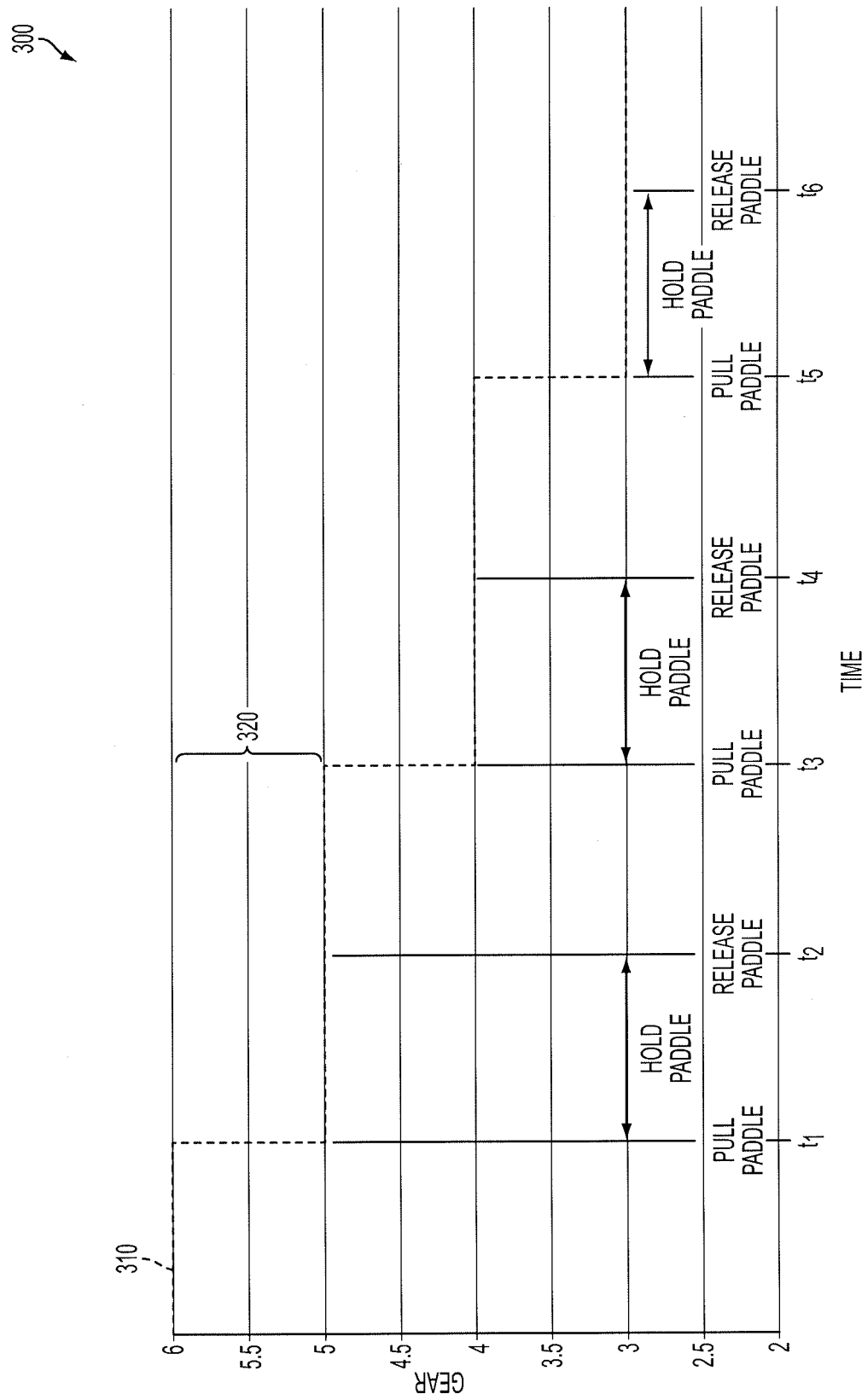
FIG. 3A is a graph of gear steps of a 6 speed or CVT without paddle shift logic according to an implementation of the present application.
Figure 3B:
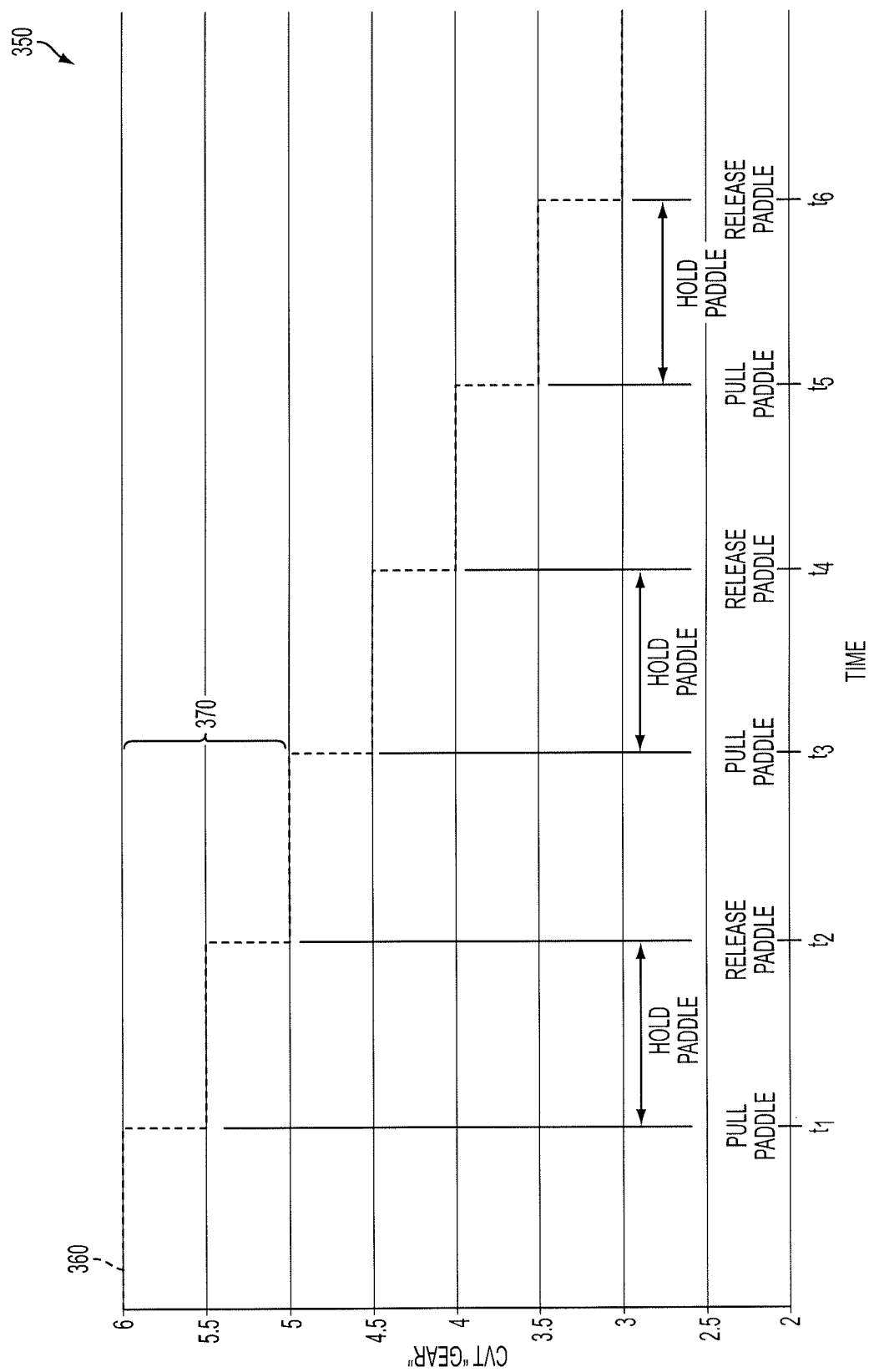
FIG. 3B is a graph of gear steps of a CVT with 6 simulated gears and having paddle shift logic according to an implementation of the present application.

FIG. 3A shows a graph 300 of performing several shift paddle hold/releases on a CVT with 6 simulated gears or a 6 speed AT (having 6 gears) without the paddle logic activated. The curve 310 shows the current gear over time. FIG. 3B shows a graph 350 of performing the same shift paddle hold/releases on the CVT with 6 simulated gears with the paddle logic activated. The curve 360 shows the current gear over time. The curves 310 and 360 illustrate how the same shift paddle actions produce a different result with the paddle logic activated.

At time $t_1$, a shift paddle, such as the down-shift paddle 220, is pulled and held. A full downshift 320 is performed. At time $t_2$, the shift paddle is released. As seen in the curve 310, releasing the paddle has no effect.

With the curve 360, at time $t_1$ the shift paddle is pulled and held. The gear downshifts from 6 to 5.5, a half downshift. Then, at time $t_2$, the shift paddle is released, effectuating a second half downshift to gear 5. Releasing the paddle completes a full downshift 370.

The curve 360 downshifts more gradually, at smaller intervals than the larger drops in the curve 310. The paddle logic may provide the driver a smoother downshifting experience.

Figure 4A:
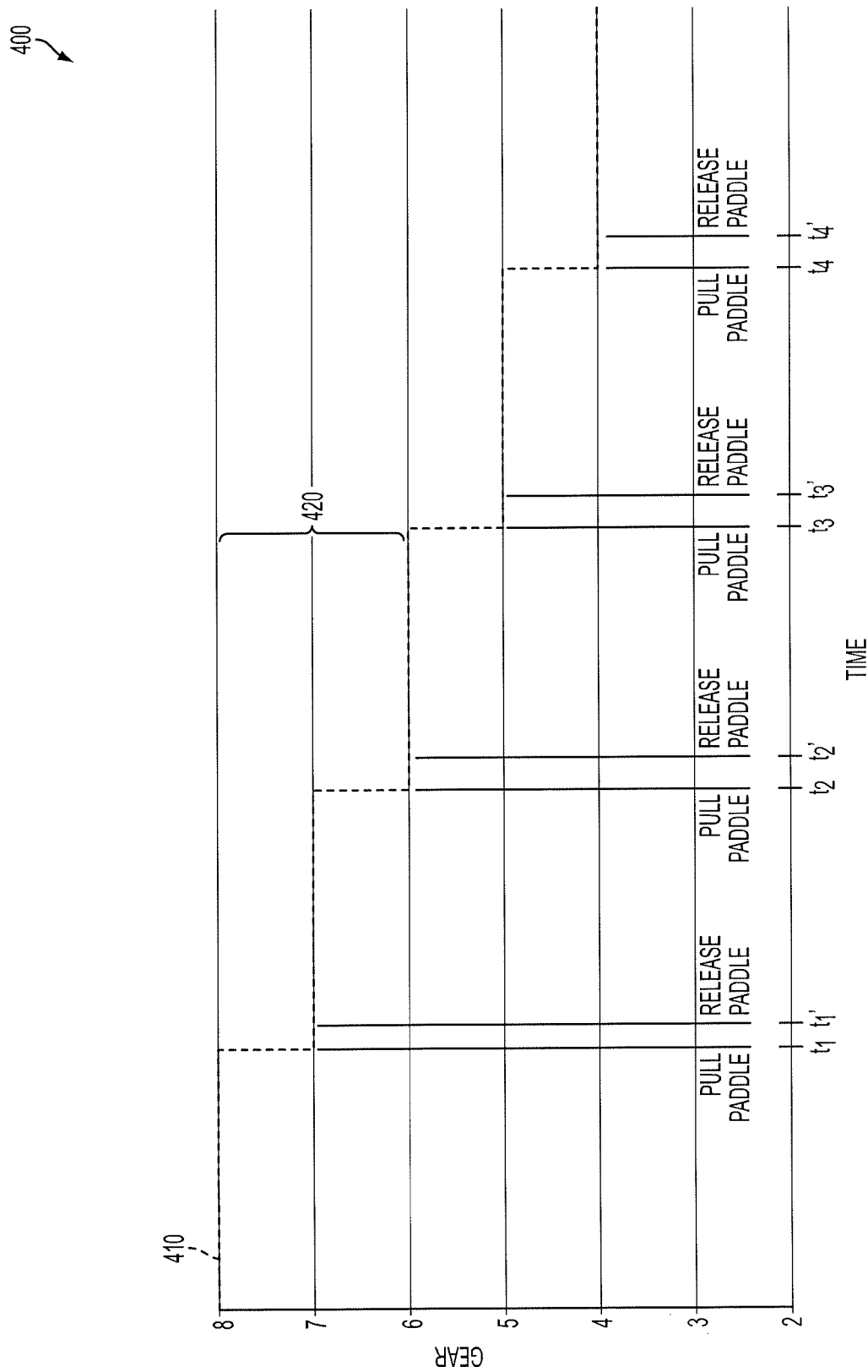
FIG. 4A is a graph of gear steps of an 8 speed transmission without paddle shift logic according to an implementation of the present application.
Figure 4B:
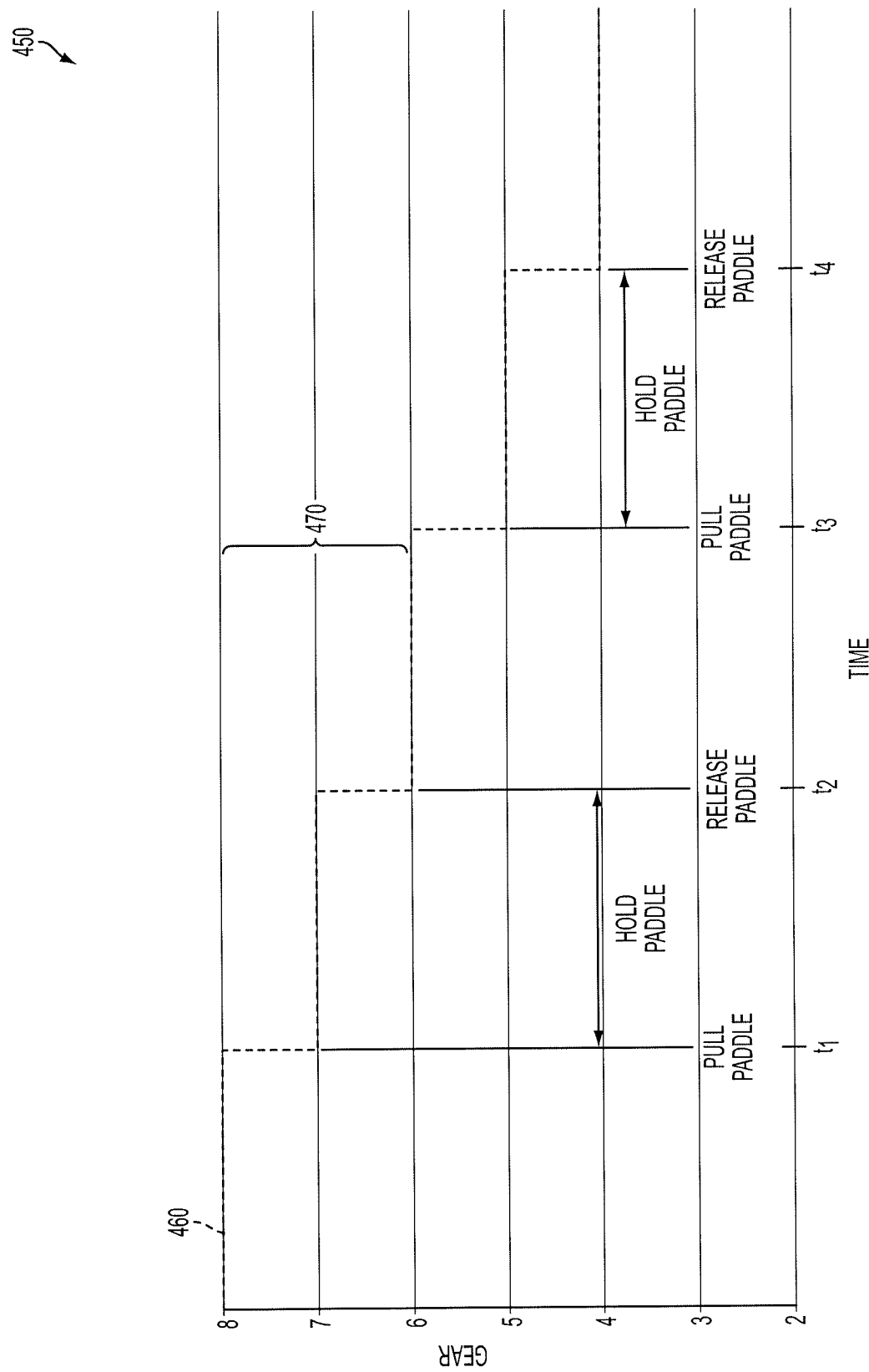
FIG. 4B is a graph of gear steps of an 8 speed transmission with paddle shift logic according to an implementation of the present application.

FIG. 4A shows a graph 400 of downshifting an 8 speed AT (having 8 gears) without the paddle logic activated. The curve 410 shows the current gear over time. FIG. 4B shows a graph 450 of downshifting an 8 speed AT with the paddle logic activated. The curve 460 shows the current gear over time. The curves 410 and 460 illustrate how the paddle logic simplifies the actions needed to downshift the same number of gears.

In FIG. 4A, at time $t_1$, a shift paddle, such as the down-shift paddle 220, is pulled. The gear downshifts from 8 to 7. At time $t_1'$, the paddle is released. At time $t_2$, the paddle is pulled, and subsequently released at time $t_2'$. The gear downshifts from 7 to 6. To complete two downshifts 420, the paddle was pulled, released, pulled again, and released again.

FIG. 4B depicts the action needed to perform two downshifts 470. At time $t_1$, the paddle is pulled and held. The gear downshifts from 8 to 7. At time $t_2$, the paddle is released, and the gear downshifts from 7 to 6. With the paddle logic activated, the two downshifts 470 is performed by pulling the paddle, holding it, and then releasing it.

Figure 5:
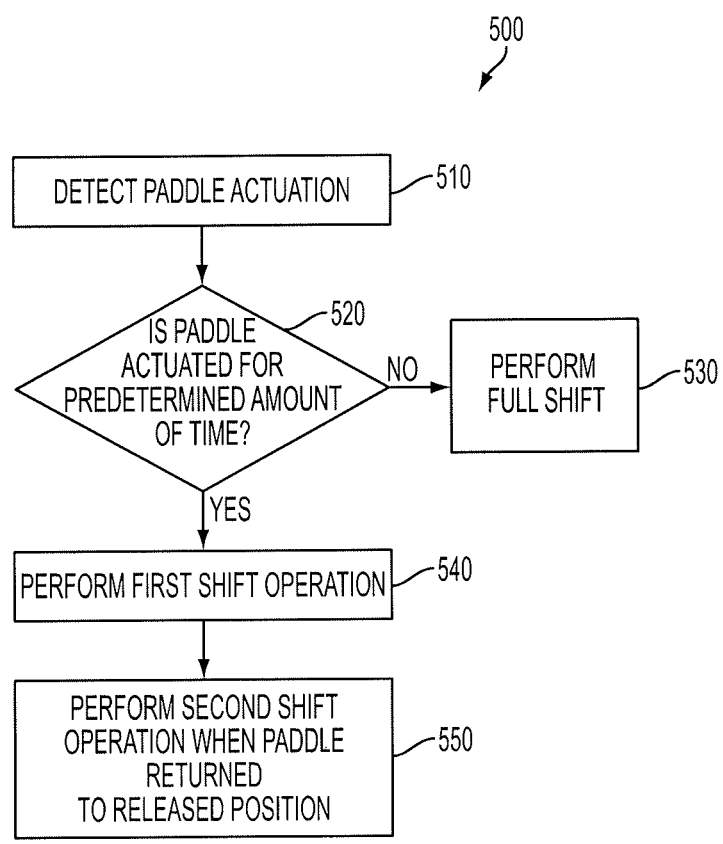
FIG. 5 is a flowchart of paddle shift logic according to an implementation of the present application.

FIG. 5 presents a flowchart 500 of the paddle logic according to an implementation of the present disclosure. At 510, a processor, such as the ECU 145 or the ECU 195, detects when a shift paddle, such as the shifter 147 or the shifter 197, is actuated or otherwise placed into an actuated position from a released position.

At 520, the processor determines whether the paddle is held or otherwise actuated in the actuated position for a predetermined amount of time. The predetermined amount of time may be, for example, 1 second, or may be any other appropriate time. The predetermined amount of time may correspond to a time duration for a transmission, such as the transmission 140 or the transmission 190, to perform or complete a shift operation, such as a half-shift. Alternatively, the predetermined amount of time may correspond to an expected amount of time for a driver to hold a shift paddle.

The paddle may send a first signal to the processor when the paddle is actuated. The processor may determine whether the paddle was held by calculating how long the first signal is asserted for comparison with the predetermined amount of time. Alternatively, the processor may determine whether the first signal was asserted for at least the predetermined amount of time. In other implementations, the paddle may send the first signal only after it has been held for the predetermined amount of time. The paddle will also send a second signal to the processor when it is released or otherwise returned to the released position.

If the paddle is not held for the predetermined amount of time, at 530, the processor commands the transmission to perform a full shift. If the paddle is held for the predetermined amount of time, at 540, the processor commands the transmission to perform a first shift operation, such as a half-shift. In certain implementations, the processor may instead command the transmission to perform a first full shift.

At 550, the processor commands the transmission to perform a second shift operation, such as a half-shift, when the paddle is released or otherwise returned to the released position. When the first and the second shift operations are half-shifts, the full shift is completed at 550. In certain implementations, the processor may instead command the transmission to perform a second full shift. The paddle sends the second signal to the processor when it is returned to the released position. Alternatively, the paddle may de-assert the first signal, alerting the processor as if a second signal was sent. Thus, the paddle logic provides a driver with additional shift control.

Those of ordinary skill would appreciate that the various illustrative logical blocks, modules, and algorithm steps described in connection with the examples disclosed herein may be implemented as electronic hardware, computer software, or combinations of both. Furthermore, the present application can also be embodied on a machine readable medium causing a processor or computer to perform or execute certain functions.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The various illustrative logical blocks, units, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described implementations are to be considered in all respects only as illustrative and not restrictive and the scope of the application is, therefore, indicated by the appended claims rather than by the foregoing description. All changes which come within the meaning and range of equivalency of the claims are to be embraced within their scope.

What is claimed is:

1. A system for performing a gear shift in an automobile comprising:
    a transmission configured to shift gears;
    a paddle shifter configured to transmit a first signal when the paddle shifter is moved from a released position to an actuated position and to transmit a second signal when the paddle shifter returns to the released position from the actuated position; and
    a processor coupled to the transmission and the paddle shifter and that:
        starts a timer in response to receiving the first signal,
        instructs the transmission to perform a full shift in response to receiving the second signal before the timer reaches a predetermined amount of time,
        instructs the transmission to perform a first half-shift in response to the timer reaching the predetermined amount of time before receiving the second signal, and
        instructs the transmission to perform a second half-shift in response to receiving the second signal after the timer reaches the predetermined amount of time to complete a full shift.

2. The system of claim 1, wherein the transmission is an automatic transmission (AT).

3. The system of claim 2, further comprising a torque converter and a lock-up clutch connected to the transmission.

4. The system of claim 3, wherein when performing the first half-shift, the transmission releases the lock-up clutch.

5. The system of claim 3, wherein when performing the second half-shift, the transmission changes at least one gear.

6. The system of claim 1, wherein the transmission comprises a continuously variable transmission (CVT) and the full shift comprises a shift from a first gear ratio to a second gear ratio.

7. The system of claim 6, wherein when performing the first half-shift, the transmission shifts to a mid-gear ratio between the first gear ratio and the second gear ratio.

8. The system of claim 6, wherein when performing the second half-shift, the transmission shifts from a mid-gear ratio between the first gear ratio and the second gear ratio to the second gear ratio.

9. The system of claim 1, wherein the predetermined amount of time corresponds to a time duration to complete the first half-shift.

10. The system of claim 1, wherein the predetermined amount of time is 1 second.

11. A system for performing a gear shift in an automobile comprising:
a transmission configured to shift gears;
a paddle shifter configured to transmit a first signal when the paddle shifter is moved from a released position to an actuated position and to transmit a second signal when the paddle shifter returns to the released position from the actuated position; and
a processor coupled to the transmission and the paddle shifter and that:
starts a timer in response to receiving the first signal,
instructs the transmission to perform a first shift and a second shift in response to receiving the second signal before the timer reaches a predetermined amount of time,
instructs the transmission to perform the first shift in response to the timer reaching the predetermined amount of time before receiving the second signal, and
instructs the transmission to perform the second shift in response to receiving the second signal after the timer reaches the predetermined amount of time.

12. The system of claim 11, wherein the transmission comprises an automatic transmission (AT).

13. The system of claim 11, wherein the transmission comprises an automatic transmission (AT) with at least 8 gears.

14. A method for shifting a gear in an automobile comprising:
receiving a first signal in response to a paddle shifter being moved from a released position to an actuated position and held in the actuated position for a predetermined amount of time;
instructing a transmission to perform a first shift operation in response to receiving the first signal;
receiving a second signal in response to the paddle shifter returning to the released position from the actuated position;
instructing the transmission to perform a second shift operation in response to receiving the second signal;
receiving a third signal in response to the paddle shifter being moved from the released position to the actuated position and returning to the released position from the actuated position before the predetermined amount of time; and
instructing the transmission to perform the first shift operation and the second shift operation in response to receiving the second signal before the timer reaches the predetermined amount of time.

15. The method of claim 14, wherein the first shift operation is a first half-shift, the second shift operation is a second half-shift, and performance of the first shift operation and the second shift operation completes a full shift.

16. The method of claim 15, wherein the automobile has an automatic transmission (AT), the first half-shift comprises releasing a lock-up clutch of the automobile, and the second half-shift comprises changing gears of the AT to complete the full shift.

17. The method of claim 15, wherein the automobile has a continuously variable transmission (CVT), the full shift comprises shifting from a first gear ratio to a second gear ratio, the first half-shift comprises shifting from the first gear ratio to a mid-gear ratio between the first gear ratio and the second gear ratio, and the second half-shift comprises shifting from the mid-gear ratio to the second gear ratio.

18. The method of claim 14, wherein the first shift operation is a first full shift, and the second shift operation is a second full shift.

19. The method of claim 18, wherein the automobile has an automatic transmission (AT) with at least 8 gears.

20. The method of claim 14, wherein the predetermined amount of time corresponds to a time duration to complete the first shift operation.

21. A system for performing a gear shift in an automobile comprising:
a transmission configured to shift gears;
a paddle shifter configured to transmit a first signal when the paddle shifter is moved from a released position to an actuated position and held in the actuated position for a predetermined amount of time that corresponds to a time duration to complete a first half-shift and to transmit a second signal when the paddle shifter returns to the released position from the actuated position; and
a processor connected to the paddle shifter and the transmission and that instructs the transmission to perform the first half-shift in response to receiving the first signal and instructs the transmission to perform a second half-shift in response to receiving the second signal, the second half-shift completing a full shift.

22. The system of claim 21, wherein:
when performing the full shift, the transmission shifts from a first gear ratio to a second gear ratio;
when performing the first half-shift, the transmission shifts from the first gear ratio to a mid-gear ratio between the first gear ratio and the second gear ratio; and
when performing the second half-shift, the transmission shifts from the mid-gear ratio to the second gear ratio.

23. A method for shifting a gear in an automobile comprising:
receiving a first signal in response to a paddle shifter being moved from a released position to an actuated position and held in the actuated position for a predetermined amount of time that corresponds to a time duration to complete a first shift operation;
instructing a transmission to perform the first shift operation in response to receiving the first signal;
receiving a second signal in response to the paddle shifter being released from the actuated position to the released position; and
commanding the transmission to perform a second shift operation in response to the second signal.

24. The method of claim 23, wherein the automobile has an automatic transmission (AT), the first shift operation comprises releasing a lock-up clutch of the automobile, and the second shift operation comprises changing gears of the AT to complete the full shift.

25. The method of claim 23, wherein the automobile has an automatic transmission (AT) with at least 8 gears, the first shift operation is a first full shift and the second shift operation is a second full shift.

26. The method of claim 23, wherein the automobile has a continuously variable transmission (CVT), the first shift operation comprises shifting from a first gear ratio to a mid-gear ratio between the first gear ratio and a second gear ratio and the second shift operation comprises shifting from the mid-gear ratio to the second gear ratio.

* * * * *